United States Patent [19]

Muehllehner

[11] 3,852,603

[45] Dec. 3, 1974

[54] TOMOGRAPHIC IMAGING DEVICE
[75] Inventor: Gerd Muehllehner, Glenview, Ill.
[73] Assignee: Nuclear-Chicago Corporation, Des Plaines, Ill.
[22] Filed: Aug. 24, 1973
[21] Appl. No.: 391,330

Related U.S. Application Data
[63] Continuation of Ser. No. 806,449, March 12, 1969, abandoned.

[52] U.S. Cl. .............................. 250/369, 250/366
[51] Int. Cl. ............................................. G01t 1/20
[58] Field of Search ............ 250/322, 363, 366, 369

[56] References Cited
UNITED STATES PATENTS
3,432,660  3/1969  Anger .................................. 250/322
3,612,865  10/1971  Walker .............................. 250/366

OTHER PUBLICATIONS
Image Separation Radioisotope Scanning, by Kuhl et al., from Radiology, Vol. 80, April 1963, pp. 653–661.

Primary Examiner—Archie R. Borchelt
Attorney, Agent, or Firm—Walter C. Ramm, Charles H. Thomas, Jr.; Peter J. Sgarbassa

[57] ABSTRACT

An Anger-type radiation detector caused to precess in a circle with synchronous rotation of a slanted multi-channel collimator to produce a tomographic image of the distribution of radionuclides throughout an object. One plane through the object is imaged in-focus without manipulation of the coordinate output signals from the detector, and other planes are imaged by adding appropriate sine and cosine functions of the system's angular orientation to the coordinate output signals before displaying the signals on a cathode ray tube.

3 Claims, 7 Drawing Figures

INVENTOR
Gerd Muehllehner
BY Lowell C. Bergstedt
ATTORNEY

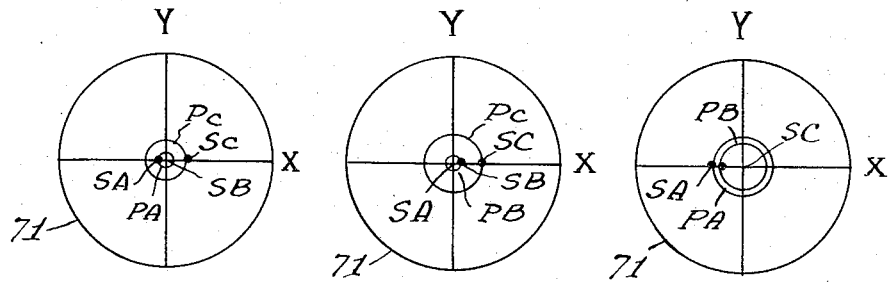
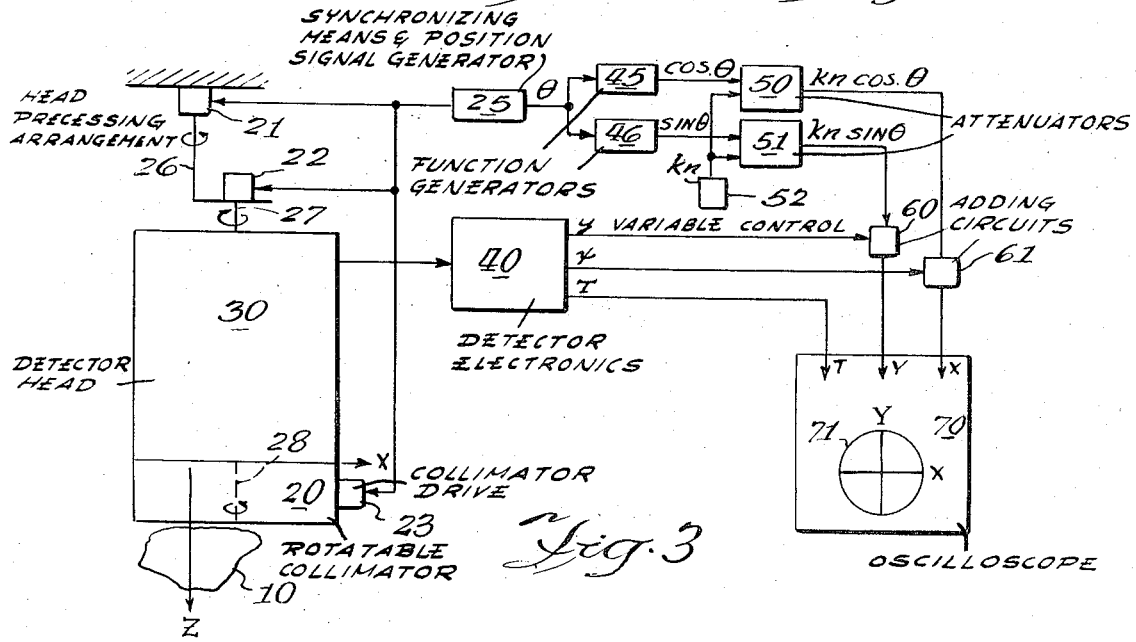
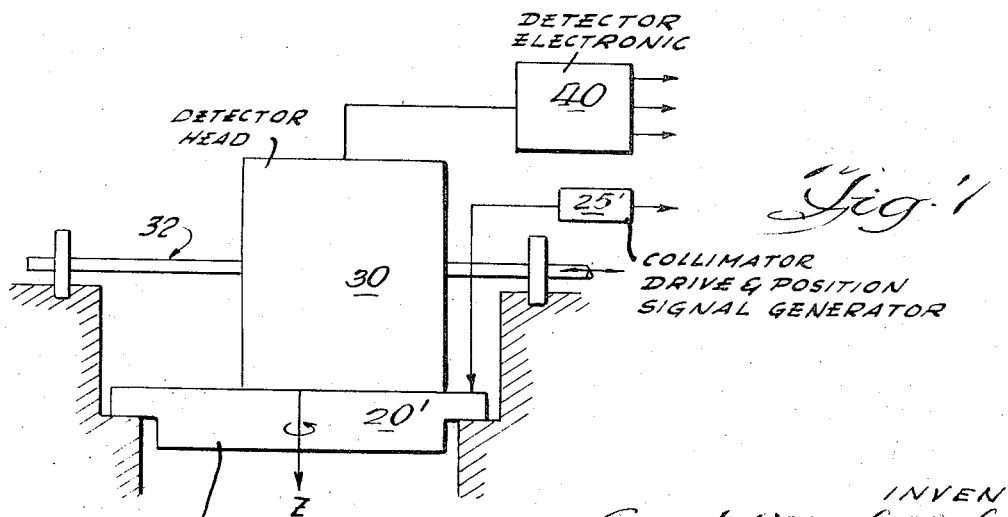

TOMOGRAPHIC IMAGING DEVICE

This is a continuation of application Ser. No. 806,449, filed Mar. 12, 1969 now abandoned.

In a co-pending patent application of William G. Walker entitled "Tomographic Radiation Camera," Ser. No. 774,320, filed Nov. 8, 1968 a stationary or camera device for developing selected tomographic images of the distribution of radionuclides throughout an object under investigation is disclosed. The embodiment disclosed comprises essentially an Anger-type detector (U.S. Pat. No. 3,011,057) with a slanted multichannel collimator between the transducer in the detector and the object. Rotation of the slanted hole collimator produces circular patterns of scintillations in the crystal from gamma rays emanating from a point source location of radionuclides in the object. The X, Y coordinate output of the detector head is transformed in accordance with specified sine and cosine signals derived from the position of the rotating collimator to produce signal inputs to an oscilloscope for displaying an in-focus image on the face panel of the oscilloscope of the distribution of radionuclides across a selected plane through the object.

The Walker tomographic radiation camera is in contrast to the tomographic radiation scanner disclosed by Hal Anger in a University of California Lawrence Radiation Laboratory report, UCRL-16899, dated May 31, 1966. In the Anger tomographic scanner, an Anger-type detector is scanned with a focused collimator attached thereto, and optical manipulations of the cathode ray tube display are provided to produce a plurality of photographic images which depict "in focus" the activity on various planes at various depths within the object being scanned. The Anger tomographic device accomplishes tomography at the expense of moving the detector in a time-consuming motion over the object.

The device disclosed in the above-mentioned co-pending Walker application provides certain advantages over the Anger device in that the detecting system is sensitive to all parts of the object at all times. It is apparent, however, that this is true only for objects that are within a conical field of view having the surface of the scintillating crystal as the base of the cone and the sides of the cone defined by one of the outermost collimating channels in the rotating collimator. Because of the non-normal angular orientation of the collimating channels, the constant sensitivity portion of the field of view is considerably less than the area of the scintillating crystal even for portions of the object immediately beneath the collimator. At greater distances beneath the collimator the area of constant sensitivity is further decreased until at some distance beneath the collimator, namely the apex of the above mentioned cone, the constant sensitivity region completely expires. Outside of the conical region of constant sensitivity the scintillating crystal views any radioactivity for only a portion of one revolution of the collimator. A useful image may still be obtained for certain areas adjacent the constant sensitivity region, but an inherent limitation on the size of an object which can be properly imaged is present in the Walker device. Of course, the conical region of constant sensitivity could be enlarged by increasing the diameter of the scintillating crystal.

The Anger device has theoretically no limitation on the size of the constant sensitivity field of view because of its inherent scanning approach. At the same time, the Anger device does not view all of the object all of the time and consequently must require a longer overall imaging time. Moreover, the Anger device could not be used for fast dynamic studies. An approach to tomography that would provide an enlarged field of view with the advantageous constant viewing of the object inherent in the Walker device would be desirable.

Therefore, the principal object of this invention is to provide improved radiation imaging apparatus.

Another object of this invention is to provide an improved device for imaging the volume distribution of radionuclides throughout an object under investigation.

More particularly it is an object of this invention to provide a radiation imaging device which has tomographic capabilities and is capable of imaging an object at least as large as the diameter of the radiation sensitive transducer and is sensitive to all of the object at all times.

Apparatus in accordance with this invention solves the field of view problem inherent in the Walker tomographic camera by providing for a precession in a circle of a radiation detector (e.g. an Anger type) keeping a constant orientation of the x, y coordinates associated therewith while at the same time rotating a slanted multichannel collimator in synchronization with the precession of the detector head so that the transducer in the detector head is constantly viewing the object under investigation but from a constantly changing angle. Thus, apparatus in accordance with this invention partakes of some of the aspects of the Anger device, namely that the detector does not remain stationary during the imaging operation but moves in an advantageous fashion to enlarge the field of view. At the same time, the apparatus in accordance with this invention partakes of the Walker device in that it constantly views the object and incorporates a rotating collimator which provides for a circular motion of images of point sources of radioactivity in the object. In a manner similar to that disclosed in the Walker application, the $x, y$ output signals from the detector may be transformed in accordance with certain sine and cosine functions of the angular orientation of the detector and the collimator to provide an in-focus image of the distribution of radionuclides across a plane at a particular selected depth in the object. Inherent in the operation of apparatus in accordance with this invention is the ability to display in-focus an image of the distribution of radionuclides at one determinable plane through the object without modification of the $x, y$ signals from the detector. This aspect of the invention will become more clear from a consideration of the detailed description given below.

It is apparent that the principal advantage of this invention is the enlargement of the constant sensitivity field of view without the requirement of enlarging the size of the radiation sensitive tranducer while at the same time the object under investigation is at all times being viewed by the transducer. This permits the rapid investigation of stationary or dynamic radioactivity distributions in the object.

Other objects, features and advantages of this invention will be apparent from a consideration of the following detailed description in conjunction with the accompanying drawings in which:

FIG. 3 is a block schematic diagram of a preferred embodiment of this invention;

FIGS. 4 through 6 are pictorial representations of various tomographic output images corresponding to the schematic shown in FIG. 1; and FIG. 7 is a block schematic diagram of an alternate form of this invention.

Figure 2:
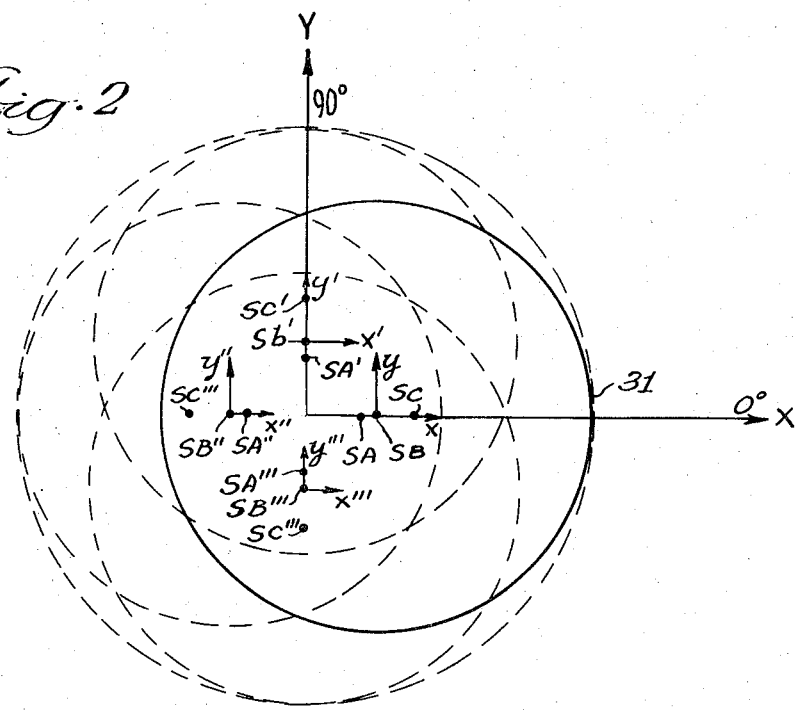
FIG. 2 is a top view of a portion of the apparatus shown in FIG. 1.
Figure 1:
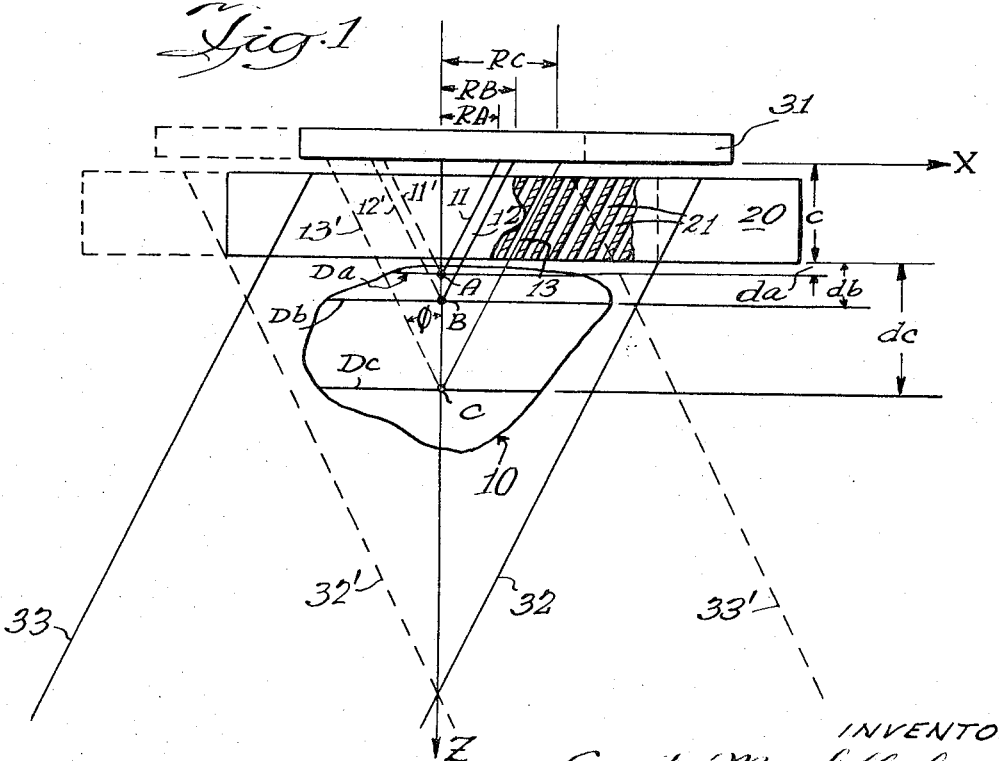
FIG. 1 is a schematic view of a portion of a preferred embodiment of this invention useful in describing its operation.

Referring now to FIGS. 1 and 2, a collimator 20 is shown interposed between a radiation sensitive transducer 31 and an object 10 under investigation. Collimator 20 is a radiation shielding means which defines a substantially uniform radiation acceptance direction for each elemental area of transducer 31 and comprises essentially a cylindrical slab of radiation opaque material, such as lead, defining a plurality of collimating channels (not shown). A typical collimator may have as many as a thousand individual collimating channels with each of the channels having a common axial orientation at an angle $\phi$ to a line normal to the surface of transducer 31. A cross section of the individual collimating channels may be cylindrical or square or hexagonal or any other appropriate configuration. The important aspect of the collimator is that the axial orientation of each channel is the same and is non-normal to the surface of transducer 31.

In a preferred embodiment of this invention involving an Anger-type radiation detector, transducer 31 becomes a thin cylindrical crystal of thallium-activated sodium iodide. The other elements in an Anger-type detector, such as a crystal window, a lightpipe, a bank of photomultiplier tubes, etc., are not shown since they are well-known from the descriptions in Anger U.S. Pat. No. 3,011,057 and in the numerous publications on Anger-type scintillation cameras.

In addition, the structural means for supporting collimator 20 in the illustrated physical relationship between transducer 31 and the object 10 is not shown because it is considered to be obvious to those skilled in the art how such a collimator could be supported in a rotatable fashion beneath the basic detector of an Anger-type scintillation camera. The spacing between the top of collimator 20 and the bottom of crystal 31 is provided only to make a clear pictorial representation of certain aspects of this invention, and it should be understood that, in a typical actual device, the top of the collimator would be very close to the bottom of the crystal.

For purposes of illustration, collimator 20 is shown in a particular orientation which will be designated as the reference orientation or as a 0° designation in polar coordinates. In this reference orientation, the collimator channels are angled such that the field of view of transducer 31 is the skewed cylindrical volume within the lines designated 32 and 33. The object 10 is completely within this field of view. A fixed rectangular coordinate system is shown on FIGS. 1 and 2 with the X, Y coordinates essentially on the bottom surface of the scintillating crystal 31 but with the +Z axis downward instead of upward as in the ordinary system of rectangular or volume coordinates. The Z axis is the axis around which the detector, which includes crystal 31, precesses so that, as shown in FIG. 2, a second set of rectangular coordinates $x, y$ having an origin on the center of crystal 31 moves in a circle about the origin of the rectangular coordinates X, Y while maintaining the same orientation. In other words, the detector moves with a circular motion without rotating, and this motion is what will be termed hereinafter a circular precession of the detector. When the detector, including crystal 31, has precessed through 180° and collimator 20 has correspondingly rotated through 180°, the position of crystal 31 and collimator 20 will be that shown in dotted lines in FIG. 1. At this point, collimator 20 will provide crystal 31 with a skewed cylindrical field of view within the lines 32', 33'. It should be noted, of course, that the rotation of collimator 20 tracks the precession of crystal 31 so that the angle of precession and the angle of rotation remain identical at all times. Thus, with this compound motion of precession of crystal 31 and rotation of collimator 20, the object 10 will remain within the field of view of crystal 31 but the angle from which the object 10 is viewed will be constantly changing.

The effect of this compound motion on the images of radionuclides within the object 10 generated by emanating gamma rays striking crystal 31 will now be described with reference to three point sources of radation, A, B and C which are located, for purposes of simplicity of illustration, on the Z axis at distances da, db and dc beneath the bottom surface of collimator 20. Point source A lies on a plane Da through object 10 having a constant distance da beneath collimator 20 and similarly for the plane Db and Dc. When collimator 20 and crystal 31 are in a reference orientation ($\theta = 0°$), gamma rays from source A will travel along a line 11 and strike crystal 31 at a point designated SA in FIG. 2. Similarly, gamma rays from sources B and C will travel along the lines designated 12 and 13 respectively and strike crystal 31 at points, designated in FIG. 2, SB and SC. After crystal 31 has precessed through an angle of 90° with a corresponding 90° rotation of collimator 20, gamma rays from sources A, B and C will strike crystal 31 at points designated in FIG. 2 as SA', SB' and SC'. Then, when further rotation of crystal 31 to the 180° orientation, along with rotation of collimator 20 to the same orientation, gamma rays from sources A, B and C will strike crystal 31 in its new position on points designated in FIG. 2 as SA'', SB'' and SC''. The location for scintillations caused by gamma rays emanating from sources A, B and C when crystal 31 and collimator 20 are in a 270° orientation is also shown in FIG. 2.

Referring specifically to FIG. 2, it can be seen that the scintillations produced in crystal 31 by source A describe a circle having a radius RA as crystal 31 precesses through a complete circle. Similarly, sources B and C produce scintillations in crystal 31 that describe circles with radii RB and RC, respectively. These circular loci of scintillations have these radii with respect to the fixed coordinate system X, Y having its origin at the center of precession of crystal 31. However, as crystal 31 precesses around the origin of this fixed coordinate system, the origin of the coordinate system $x, y$ is constantly changing in location. The output signals developed by the detector, which includes transducer 31, are related to the coordinate system $x, y$ so that the output image display of the $x, y$ signals from the detector, without any transformation of the $x, y$ signals, would be that shown in FIG. 4. As shown in FIG. 4, gamma rays from source A produce scintillations at location SA on the $-x$ axis with respect to the coordinate system $x, y$ when the system is in a 0° orientation. Gamma rays from source B produce scintillations SB at the origin of the coordinate system $x, y$ and gamma rays from source C produce scintillations SC on the $+x$ axis of the coordinate system $x, y$. Of course, in FIG. 4, the output image on the oscilloscope screen is in the form of a dot of light for each scintillation occurring in crystal 31 at a location in $x, y$ coordinates. Thus, it can be seen that as the system goes through a complete 360° precession with accompanying collimator rotation, source B always produces scintillations at the origin of the coordinate system $x, y$ associated with the detector, whereas sources A and C produce scintillations which result in a circular movement on the oscilloscope screen. However, the radius of the circular path PA on the oscilloscope screen does not correspond to the radius RA, but rather to the algebraic difference between the radius RA and the radius RB, the radius RB being the radius of the circular precession of the detector. Similarly, the radius of path PC on the oscilloscope screen corresponds to the algebraic difference between radius RC and radius RB. The reason for this is, of course, that the origin of the coordinate system $x, y$ is constantly changing. From this description it can be seen that, without modification of the output signals from the detector, source SB is imaged as if it were stationary, and this would be true for all sources distributed across the plane D$b$ through the object 10. All of the sources on plane D$a$ would result in circular image loci similar to path PA shown in FIG. 4 but with a different center and all of the sources on plane D$c$ would produce circular image loci similar to path PC shown in FIG. 4.

The radius of path PA can be expressed in the following form $$Ra = RB - RA,$$

(E-1)

A similar equation can be written for the magnitude of the radius of path PC. The general equation for the radius of a path for a source located on a plane D$n$ at a distance $dn$ from the bottom of collimator 20 is as follows:

$$Rn = RB - RN,$$

(E-2)

where $$RN = (C + dn) \tan \phi.$$

(E-3)

It can be shown that the equation for the circular path produced as an output on the screen of the cathode ray tube displaying uncorrected signals from the detector for a point source located at the coordinate ($Xn, Yn, Zn$) is as follows $$x = Xn + (R - RN) \cos \theta$$

(E-4)

$$y = Yn + (R - RN) \sin \theta,$$

where $$RN = Zn \tan \phi$$

(E-5)

and where $R$ is the radius of precession of the crystal and detector head which is RB in FIG. 1. From the set of equations (E-4) it can be shown that, by appropriate modification of the $x, y$ signals from the detector, a selected in-focus image of a plane can be displayed on the face of the cathode ray tube in a manner similar to that disclosed in the above-mentioned co-pending Walker application. It is apparent that appropriately attenuated sine and cosine functions which track the motion of the collimator and detector system can be added to the $x, y$ signal outputs of the detector to generate an image on the cathode ray tube which is in-focus for a plane at a depth beneath the collimator specified by the attenuation coefficient on the sine and cosine function. The equations which express this are taken from equations (E-4) and are the following $$X = x + (RN - R) \cos \theta$$

(E-6)

$$Y = y + (RN - R) \sin \theta.$$

Thus, in FIG. 3, a block diagram of a system for accomplishing selected readout of a particular plane is shown.

In FIG. 3, the object 10 to be investigated is shown positioned below collimator 20 in a position corresponding to that shown in FIG. 1. Collimator 20 is rotatably mounted beneath a detector 30 which is preferably of the Anger scintillation camera type, but may be any radiation detector which includes a substantially planar radiation sensitive transducer and produces an output representing plane position coordinates of each quantum of radiation impinging on the transducer. Detector 30 is suspended from a fixed support by a structure schematically shown in FIG. 3 as including support members 26 and 27 and rotating means 21 and 22. In essence, detector 30 and collimator 20 are mechanically supported on the horizontal portion of support arm 26 and are suspended therefrom by the support member 27. The block designated 22 comprises some means for causing the detector-collimator combination to rotate in a clockwise direction with respect to the fixed support from which it is suspended. In this manner detector 30 would be caused to precess about the designated Z axis with its associated $x, y$ coordinate system maintaining a fixed orientation in place. Block 23 designates a means for rotating collimator 20 in a counterclockwise direction on its own axis 28. It will be appreciated that the respective rotations must be coordinates so that respective angular velocities of rotations of collimator 20 on its axis, detector 30 on its axis, and the whole system on the Z axis will be identical. Block 25 designates a means for coordinating the respective rotation means. Various means for accomplishing these functions, such as motor and gear combinations with a general synchronizing means 25, could be fashioned by the mechanics skilled in this art. The position $\theta$ is signalled at the output of block 25, but it should be understood that this position signal could be derived from the motion of any of the members 20, 26 or 27. This position signal θ is coupled as an input to a pair of function generators 45 and 46 which develop output signals cos θ and sin θ, respectively. The outputs from function generators 45 and 46 provide individual imputs to variable attenuators 50 and 51 which function under the control of a variable attenuator control 52. The output of variable attenuator control 52 is an attenuation factor K$n$, and the outputs of factors 50 and 51 are, respectively, K$n$ cos θ and K$n$ sin θ.

The output from detector 30 is coupled to detector electronics 40 from which the outputs $x$, $y$, T are provided. The output T is coupled to triggering or unblanking input T to oscilloscope 70. The outputs $x$, $y$ from detector electronics 40 are added to the outputs from attenuators 50 and 51 in adding circuits 60 and 61, and the outputs of adding circuits 60 and 61 provide inputs to Y and X input terminals, respectively, of oscilloscope 70. Oscilloscope 70 includes a face panel 71 of a cathode ray tube on which a dot of light is produced in a position corresponding to the X and Y input signals when a triggering signal is received.

When the attenuation coefficient K$n$ at the output of variable attenuator control 52 is set to an appropriate value corresponding to plane D$a$ in FIG. 1, the image produced on face panel 71 with timewise integration of individual dots is that shown in FIG. 5. Correspondingly, when attenuation factor K$n$ is set to an appropriate value corresponding to plane D$c$ in FIG. 1, the image displayed on face panel 71 corresponds to that shown in FIG. 6. In FIG. 5, it can be seen that source A is now imaged at the origin of the cathode ray tube screen whereas sources B and C are imaged as circles of different radii. Correspondingly, in FIG. 6, source C is imaged at the origin in the X, Y coordinate system of the oscilloscope and sources A and B are imaged as circles of different radii. Of course, FIG. 4 corresponds to the image produced when attenuation factor K$n$ is set to a zero value to that $x$, $y$ output signals from detector electronics 40 are unaltered. The attenuation coefficient K$n$ must be able to take both positive and negative values with the negative values corresponding to planes between plane D$b$ and the bottom surface of collimator 20 and the positive values of the coefficient for planes beneath plane D$b$.

It should be apparent that by duplicating certain portions of the system shown in FIG. 3 various planes of readout could be otained simultaneously. In addition, it should be understood that the $x$, $y$ signals from detector electronics 40 and the sin θ and cos θ signals from function generators 45 and 46 could be recorded on suitable recording media for later playback through appropriate apparatus to develop in-focus readouts of selected planes.

In FIG. 7, an alternate embodiment of the apparatus of this invention is shown in schematic form. In essence this embodiment comprises a larger multichannel, slanted hole collimator 20' rotating about its own Z axis under the control of a driving means 25' and a detector 30 which is mechanically arranged with respect to collimator 20' so that it precesses around the Z axis as collimator 20' rotates. In general, this precession could be accomplished by providing a system 31 to fix the X, Y orientation of detector 30 while giving it freedom to move in both X and Y directions simultaneously. The motion of collimator 20' could be used then to drive detector 30 in a circular precessing motion by an appropriate mechanical linkage. The details for accomplishing this should be apparent to those skilled in the art and need not be described here. The outputs emanating from driving means 25' and the $x$, $y$, T outputs from detector electronics 40 would be processed in the same manner as that shown in FIG. 3.

Referring again to FIG. 1, it should be apparent that a change in the radius of circular precession of detector 31 would alter the shape of the region of constant sensitivity under collimator 20 and the depth of the constant focal plane (D$b$ in FIG. 1). The constant focal plane, which is that object plane displayed in-focus without manipulations of the detector output coordinate signals, is always the location of the largest portion of the constant sensitivity region. It might be desirable, under some circumstances, to be able to vary the shape of the constant sensitivity region, and this could be implemented by providing for a variable radius of precession of the detector system.

From the above description it should also be apparent that this invention could be implemented in terms of its broadest aspect in a system in which an image is more directly produced without the development of $x$, $y$ signals for control of an oscilloscope, such as an image intensifier system. The constant focal plane could be used in such a system to read out various planes through a subject by making use of an altered spacing from the collimator to the object or an altered radius of precession.

The above descriptions of a preferred and alternate embodiments of this invention are given by way of example only, and it should be understood that numerous modifications could be made without departing from the scope of this invention as claimed in the following claims.

I claim:

1. Apparatus for imaging a volume distribution of radionuclides in an object comprising, in combination:

a radiation detector, including a radiation sensitive transducer, of the type producing outputs representing position coordinates in a planar coordinate system parallel to said transducer of quanta of radiation interacting with said transducer;

collimating means interposed between said transducer and said object for defining a substantially uniform radiation acceptance direction for each elemental area of said transducer;

driving means for synchronously changing said radiation acceptance direction of said collimating means and the relative spatial positions of said detector and said object to produce in said transducer stationary images of quanta of radiation emanating from a preselected focal plane through said object and parallel to said transducer, and moving images of quanta of radiation emanating from other parallel object planes passing through said object, said moving images having predetermined patterns differing according to the depth of the associated plane through said object, and image converting means coupled to said driving means and to said detector for converting selected outputs from said transducer in accordance with said predetermined patterns of moving images into a stationary image display of quanta of radiation emanating from a preselected object plane other than said focal plane.

2. Apparatus as claimed in claim 1, wherein said detector produces as a pair of coordinate signals $x$, $y$ for each quanta of radiation detected;

said collimating means comprises shielding of a substantially radiation opaque material defining apertures spaced at equal intervals in an array and having a substantially common non-normal axial orientation $\phi$ with respect to said transducer, said collimator means being rotatably mounted adjacent said transducer;

said driving means comprises means for producing a precession of said detector in a circle of preselected radius R and means for producing a rotation of said collimator in synchronism with said detector such that said predetermined pattern of movement of images of quanta of radiation emanating from an object plane located at a distance $Dn$ from said transducer is circular with a radius equal to $R-(Dn) \tan \phi$; and said image converting means comprises means for sensing the angle of rotation $\theta$ between said collimator and said detector and producing a pair of coordinate correction signals representing coordinate correction functions $[R-(Dn) \tan \phi] \cos \theta$ and $[R-(Dn) \tan \phi] \sin \theta$, respectively; combining circuit means for combining said coordinate signals and said coordinate correction signals to produce a pair of corrected coordinate signals; and display means for displaying said corrected coordinate signals.

3. Apparatus for imaging an object having a three-dimensional distribution of radionuclides therethroughout, comprising:

a radiation detector including a radiation sensitive transducer having a two dimensional radiation detecting capability and means associated with said transducer operative to produce a first pair of signals, $x$ and $y$, representing the plane position coordinates of impingement of quanta of radiation interacting with said transducer;

a multichannel collimator rotatably mounted in a position adjacent said transducer, the axes of said channels of said collimator being uniformly oriented at a non-normal angle $\phi$ with respect to said transducer;

driving means operatively associated with said detector and said collimator for moving said detector in a circular precession at a selected radius R over said object and for rotating said collimator in a synchronous relation to said detector;

correction circuit means for generating a second pair of signals representing coordinate correction functions $[R-(Dn) \tan \phi] \cos \theta$ and $[R-(Dn) \tan \phi] \sin \theta$ where $Dn$ is the distance between said transducer and a preselected object plane other than a focal plane defined by the axes of said collimator channels, the radius R, and the distance $Dn$, and $\theta$ is the time varying position of said detector in a cylindrical coordinate system;

combining circuit means for arithmetically combining said first pair of signals and said second pair of signals to produce a third pair of signals representing corrected position coordinates associated with each quantum of radiation emanating from said preselected object plane and interacting with said transducer; and display means receiving said third pair of signals for producing images of quanta of radiation emanating from said preselected object plane, each image representing an individual quantum of radiation interacting with said transducer and being positioned in accordance with said corrected position coordinates.

* * * * *